United States Patent [19]

Ohnishi et al.

[11] Patent Number: 4,831,383

[45] Date of Patent: May 16, 1989

[54] SYSTEM FOR DETECTING UNDERGROUND OBJECTS

[75] Inventors: Hiroyasu Ohnishi; Tatsukichi Matsuura, both of Tokyo; Kouji Maeda, Hyogo; Yasuhiro Uekubo, Hyogo; Akio Jitumori, Hyogo; Teruo Usami, Hyogo, all of Japan

[73] Assignees: The Tokyo Electric Power Co., Inc.; Mitsubishi Denki Kabushiki Kaisha, both of Tokyo, Japan

[21] Appl. No.: 166,472

[22] Filed: Mar. 10, 1988

[30] Foreign Application Priority Data

Mar. 11, 1987 [JP] Japan .................................. 62-55681

[51] Int. Cl.⁴ ........................ G01S 13/90; G01V 3/12
[52] U.S. Cl. ......................................... 342/22; 342/25
[58] Field of Search .................................... 342/25, 22

[56] References Cited

U.S. PATENT DOCUMENTS

| 4,132,989 | 1/1979 | Arens | 342/25 |
| 4,471,357 | 9/1984 | Wu et al. | 342/25 |
| 4,594,593 | 6/1986 | Nohmi | 342/25 |
| 4,677,438 | 6/1987 | Michiguchi et al. | 342/22 |
| 4,706,031 | 11/1987 | Michiguchi et al. | 342/22 |

OTHER PUBLICATIONS

Usami et al., "Detection of the Underground Pipes by Synthetic Aperture Techniques", Transactions of the IECE of Japan, vol. E 69, No. 4, Apr. 1986, pp. 491-493.

Volakis et al., "Improved Identification of Underground Targets Using Video Pulse Radars by Elimination of Undesired Natural Resonances", IEEE Transactions on Antennas and Propagation, vol. AP-31, No. 2, Mar. 1983, pp. 334-340.

Iizuka et al., "Detection of Nonmetallic Buried Objects by a Step Frequency Radar", Proceedings of the IEEE, vol. 71, No. 2, Feb. 1983, pp. 277-280.

"Survey on Underground Object by Means of Radio Wave", Proceedings of the Institute of Electronics and Communication Engineers of Japan, vol. 67, No. 3, Mar. 1984, pp. 308-311.

Primary Examiner—Thomas H. Tarcza
Assistant Examiner—Gilberto Barrón, Jr.
Attorney, Agent, or Firm—Bernard, Rothwell & Brown

[57] ABSTRACT

A system for detecting underground objects is disclosed wherein image data obtained through a deep range-migration correction and image data obtained through a shallow range-migration correction are combined so that data at the corresponding positions on both the image data at high level may mutually intensify, whereas other data may mutually weaken. The target spot on the thus combined image data is made sharp and provides sufficently high resolution.

3 Claims, 3 Drawing Sheets

SYSTEM FOR DETECTING UNDERGROUND OBJECTS

BACKGROUND OF THE INVENTION

1. Field of the Invention

The present invention relates to a system for detecting underground objects by a synthetic aperture method, and more particularly, to improvement of the resolution in the system.

2. Description of the Prior Art

In FIG. 2 is shown a general form of the so-called synthetic aperture underground targets detecting system which is structured of a general form of the synthetic aperture processing in use for satellite-radar and airborne radar and, in addition thereto, means for geological correction indispensable to detection of underground targets. As examples of techniques to which a system as aforementioned is basically applied, there are known such as disclosed in a paper entitled "Electromagnetic Detection of Underground Objects", pages 308–311, Proceedings of the Institute of Electronics and Communication Engineers of Japan, Vol. 67, No. 3, March 1984. In the explanatory chart of the general form in FIG. 2, ST1 is a step of collecting reflected wave profile data, ST2 is a step of performing preprocessing in succession to step ST1, ST3 is a step of performing synthetic aperture processing in succession to step ST2, ST4 is a step of performing geological correction in succession to step ST3, and ST5 is a step of performing output processing in succession to step ST4.

FIG. 3 is a diagram for explaining the collection of the reflected wave profile data at the aforesaid step ST1, referring to which reference numeral 1 denotes a target such as a pipe, 2 denotes soil in which the target 1 is buried, 3 denotes a transmitter, 4 denotes a transmitting antenna for emitting a pulse signal from the transmitter 3 as an electromagnetic wave into the aforesaid soil 2, 5 denotes a receiving antenna for receiving the wave reflected by the target 1 of the electromagnetic wave emitted from the transmitting antenna 4, and 6 denotes a receiver connected to the receiving antenna 5, where the transmitting antenna 4 and the receiving antenna 5 are fixedly held at a predetermined mutual distance y and adapted to move in increments of a predetermined distance in a direction at right angles with the direction in which both the antennas 4, 5 are disposed, as indicated by the arrow X.

Below will be described the operations. First, at step ST1, collection of reflected wave profile data is performed on a plane cutting through the soil at right angles with the ground. That is, a monocyclic pulse, for example, is emitted from the transmitting antenna 4 at every increment in the movement and the reflected wave is received by the receiving antenna 5. The reflected wave from the target 1 is received in the shortest period of time when both the transmitting antenna 4 and the receiving antenna 5 are directly above the target 1 and the time becomes longer as the antennas separate from the position right above the target, and thus parabolically spreading reflected wave profile data are obtained for each of the targets 1.

Since the monocyclic pulse propagating through the soil 2 is greatly attenuated, largely distorted, and accompanied by noises at high level, and further, since there is a direct coupling between the transmitting antenna 4 and the receiving antenna 5, the direct coupling and noises, and further, the distortions are removed in the preprocessing at step ST2. At the following step ST3, such preprocessed reflected profile data are subjected to synthetic aperture processing. That is, the reflected wave profile data are provided with range migration correction and the hyperbolic data corresponding to each target 1 are made to cohere around the vertex portion, and thereby, image data thereof are obtained.

The thus obtained image data are still those expressed with respect to the scale of time. Therefore, geological correction is performed in the following step ST4 with dielectric constant $\epsilon$ S of the soil 2 used, and thereby, image data expressed with respect to the scale of length are obtained, and then, the image output of the detected targets is displayed on a display device or the like at step ST5.

Since the prior art underground target detecting systems have been constructed as above, there have been such problems with them that the target spots on the obtained image data have not been sharp ones and have been affected by noises, distortions, or the like that are not completely removed in the preprocessing and therefore sufficient resolution has not been obtained.

SUMMARY OF THE INVENTION

The present invention was made to solve the aforementioned problems, and accordingly, a primary object of the present invention is to obtain an underground object detecting system providing a sufficiently high resolution.

The underground target detecting system according to the present invention is such as to provide a detected image output of targets by combining image data obtained by providing reflected wave profile data with a deep range-migration correction and image data obtained by providing the same with a shallow range-migration correction.

PREFERRED EMBODIMENT OF THE INVENTION

Figure 1:
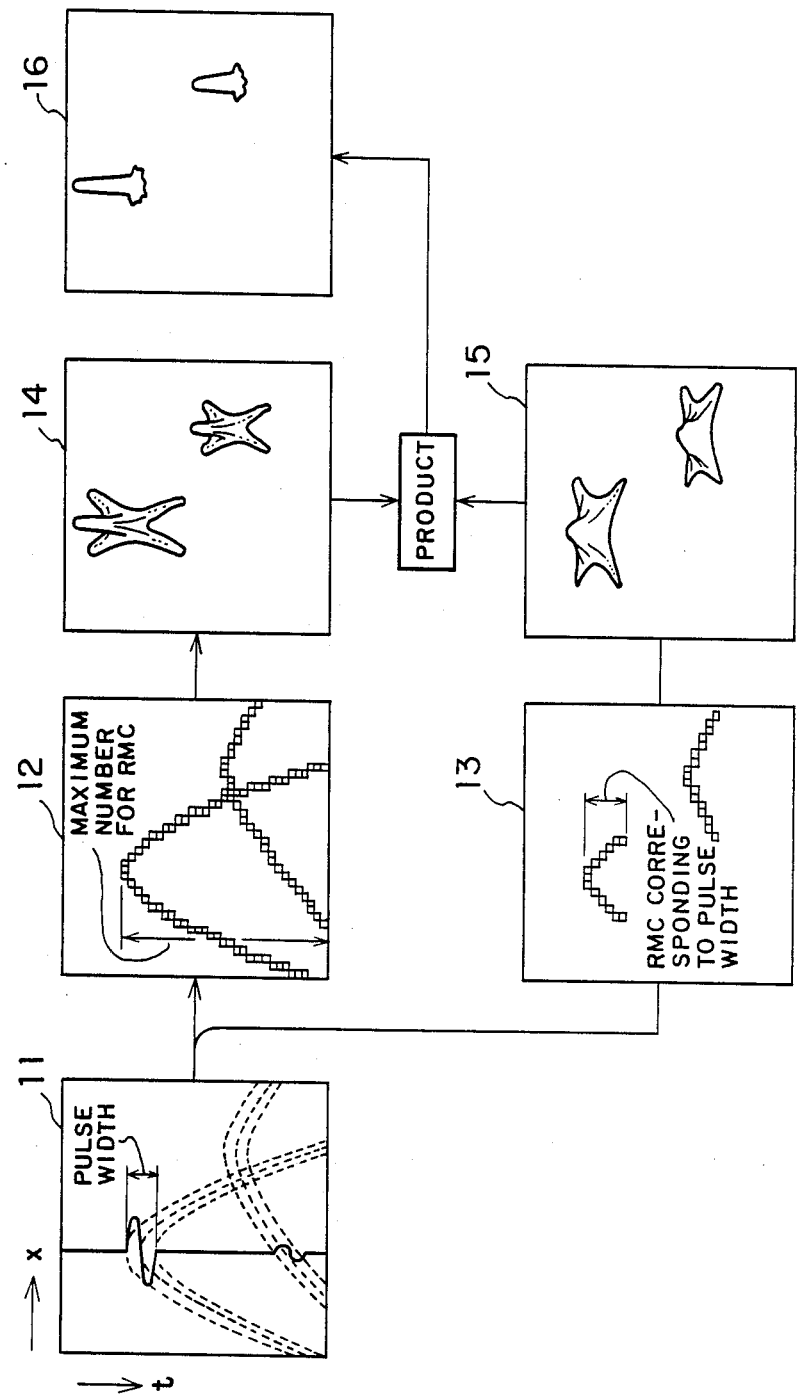
FIG. 1 is diagrams explaining an underground object detecting system according to an embodiment of the present invention.
Figure 2:
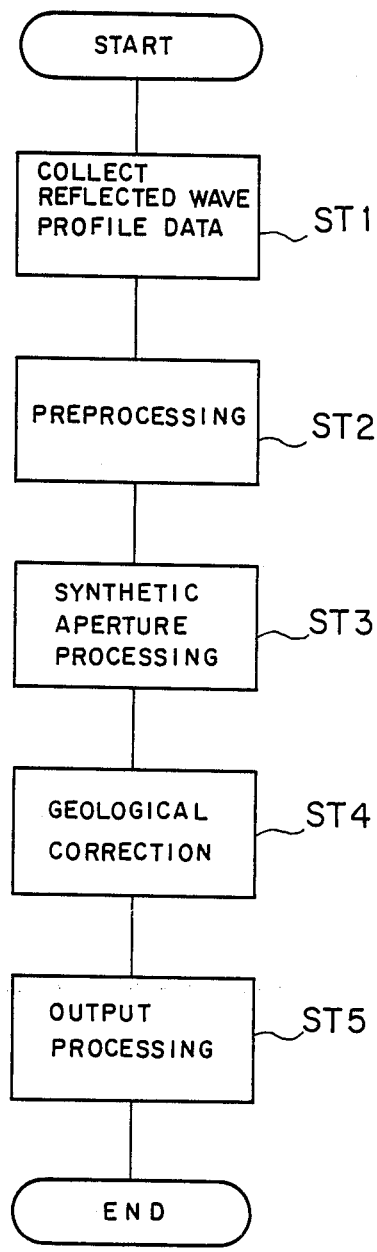
FIG. 2 is a flow chart showing a prior art underground object detecting system.
Figure 3:
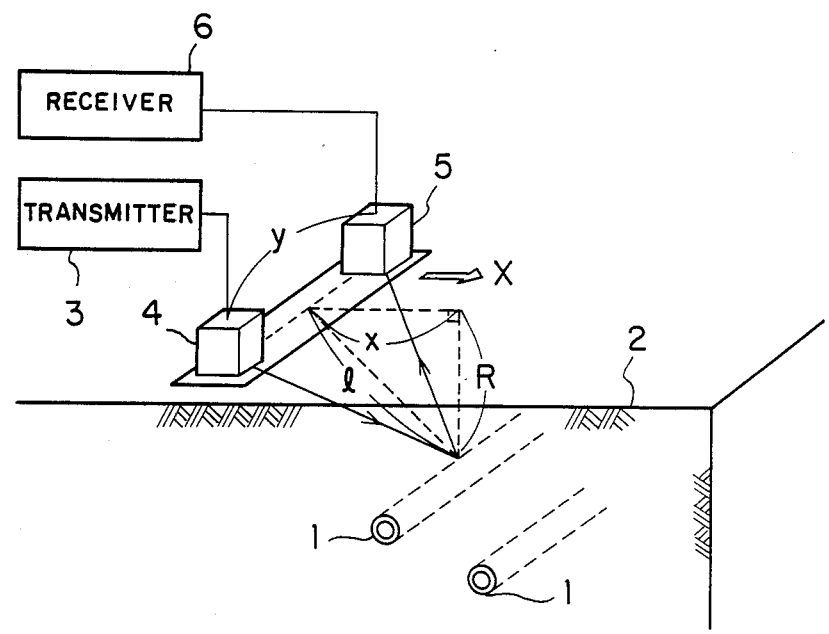
FIG. 3 is a drawing explaining collection of reflected wave profile data.

An embodiment of the present invention will be described below with reference to the accompanying drawings. Referring to FIG. 1, diagram 11 shows reflected wave profile data on a plane cutting through the soil at right angles with the ground to be subjected to a range migration correction, in which representatively indicated an ideal waveform of the reflected wave right above the target 1, while the broken lines are those connecting zero-cross points of the reflected wave at respective measurement points. Diagram 12 shows processing of a deep range-migration correction and diagram 13 shows processing of a shallow range-migration correction, in which the minute squares indicate presence of the data to be processed in the range migration corrections.

Diagram 14 shows image data obtained as the result of the deep range-migration correction of the aforesaid diagram 12, diagram 15 shows image data obtained as the result of the aforesaid shallow range-migration correction of diagram 13, and diagram 16 shows image data obtained as the result of combination of these image data 14 and 15 by taking the product of these data.

The operations will be described below. The reflected wave profile data collected in the same way as in the prior art is subjected to the preprocessing, whereby direct coupling between the transmitting antenna 4 and the receiving antenna 5, noises, and further, distortions, and the like are removed. In diagram 11 of FIG. 1, there is shown an ideal reflected wave, but, in reality, there are many other vibrational modes included therein and various noises superposed thereon.

Such reflected wave profile data are subjected to a deep range-migration correction as shown in diagram 12, whereby the data on the hyperbola corresponding to each of the targets 1 are made to cohere around the vertex. Here, the number of the range bins to be processed in the deep range-migration correction virtually corresponds to the length of the synthetic aperture, namely, it corresponds to the length of the synthetic aperture sufficient for composing the data, or it is the maximum number of the range bins usable for range migration correction. In the example shown in diagram 12, those of the maximum number usable for the range migration correction (RMC) are subject to the processing. The same reflected wave profile data are subjected to shallow range-migration correction as shown in diagram 13, whereby, in like manner to the above, the data on the hyperbola corresponding to each of the targets 1 are made to cohere around the vertex. Here, the number of the range bins to be processed in the shallow range-migration correction virtually corresponds to the pulse width, namely, it corresponds to the pulse width or to the positive or negative half wave. In the example shown in diagram 13, those of the number corresponding to the pulse width are subjected to the processing.

Since processing is made with as great a number of range bins as the maximum number usable for the range migration correction in the deep range-migration correction, the target spot on the obtained image data becomes, as indicated in diagram 14 of FIG. 1, large in height and the shape in its plan view becomes an X letter having smaller width in the direction of the azimuth. Since, on the other hand, processing is made only with as small a number of range bins as the number corresponding to the pulse width in the shallow range-migration correction, the target spot on the obtained image data becomes, as indicated in diagram 15 of FIG. 1, small in height and the shape in its plan view becomes an X letter having larger width in the direction of the azimuth, whereas its width in the direction of the range becomes smaller than the width in the direction of the range of the target spot formed on the image data of diagram 14 of FIG. 1.

Although there appear many other spots on the image data in diagrams 14 and 15 of FIG. 1 than the indicated target spots due to distortions such as vibrational modes of the reflected wave and noises, they are not shown on the diagrams. In the present case, the positions of the centers of the indicated spots are the same on both the image data, but the spots due to aforesaid distortions and noises do not always appear at the same positions.

The image data 14 obtained by the deep range-migration correction and the image data 15 obtained by the shallow range-migration correction are combined by taking their product. Accordingly, while the data at portions at high level in both the image data 14 and 15 mutually strengthen their intensity and produce data at still higher level thereat, the data at portions at low level mutually weaken their intensity and produce data at still lower level thereat, on the combined image data. And, the portion at zero level in one of the image data produces data at zero level on the combined image data even if the corresponding portion in the other image data is at high level. Since, as described above, one of the target spots on the image data 14 and 15 is narrower in the direction of the azimuth and the other is narrower in the direction of the range, the leg portions of the X letter cancel each other, although their central portions intensify each other, and therefore, a very sharp target spot with virtually no leg portions of the X letter remaining is obtained on the combined image data. Diagram 16 of FIG. 1 indicates such combined image data.

The thus obtained image data is subjected to geological correction whereby the time scale is converted into the length scale and then to output processing so as to be displayed as a detected image output of the targets.

Although, in the case described in the foregoing example the geological correction was made after the synthetic aperture processing has been performed, the reflected wave profile data may first be subjected to the geological correction whereby the time scale is converted into the length scale and then the data may be subjected to the synthetic aperture processing to obtain the same effects as in the above described embodiment.

In the present invention the reflected wave profile data are subjected to both deep range-migration correction and shallow range-migration correction and the thus obtained image data are combined to provide a detected image data output, and therefore, such effects are obtained that the image spot on the combined image data becomes sharp and provides sufficiently high resolution.

What is claimed is:

1. In a system for detecting an underground target provided with a transmitting antenna and a receiving antenna disposed at a predetermined mutual distance and adapted such that both said antennas are moved in increments of a predetermined distance on the ground in a direction virtually at right angles with the direciton in which the antennas are disposed, a pulse signal is emitted from said transmitting antenna into soil at every increment in the movement and the reflected wave is received by said receiving antenna, reflected wave profile data on a plane cutting through the soil at right angles with the ground is obtained and the data is subjected to synthetic aperture processing, whereby a detected image output of the target buried under the ground is obtained, said system for detecting an underground target comprising the steps of:

making range migration corrections in said synthetic aperture processing such that both a deep range-migration correction with range bins of a number virtually corresponding to the synthetic aperture and a shallow range-migration correction with range bins of a number virtually corresponding to the pulse width of said pulse signal are performed; and combining both the image data obtained in said range migration corrections, whereby a detected image output of said target is provided.

2. A system for detecting an underground target according to claim 1, wherein a geological correction is executed prior to said synthetic aperture processing whereby reflected wave profile data in which a time scale is converted to a length scale is obtained.

3. A system for detecting an underground target according to claim 1, wherein a geological correction is executed posterior to said synthetic aperture processing whereby reflected wave profile data in which a time scale is converted to a length scale is obtained.

* * * * *